Figure 6:
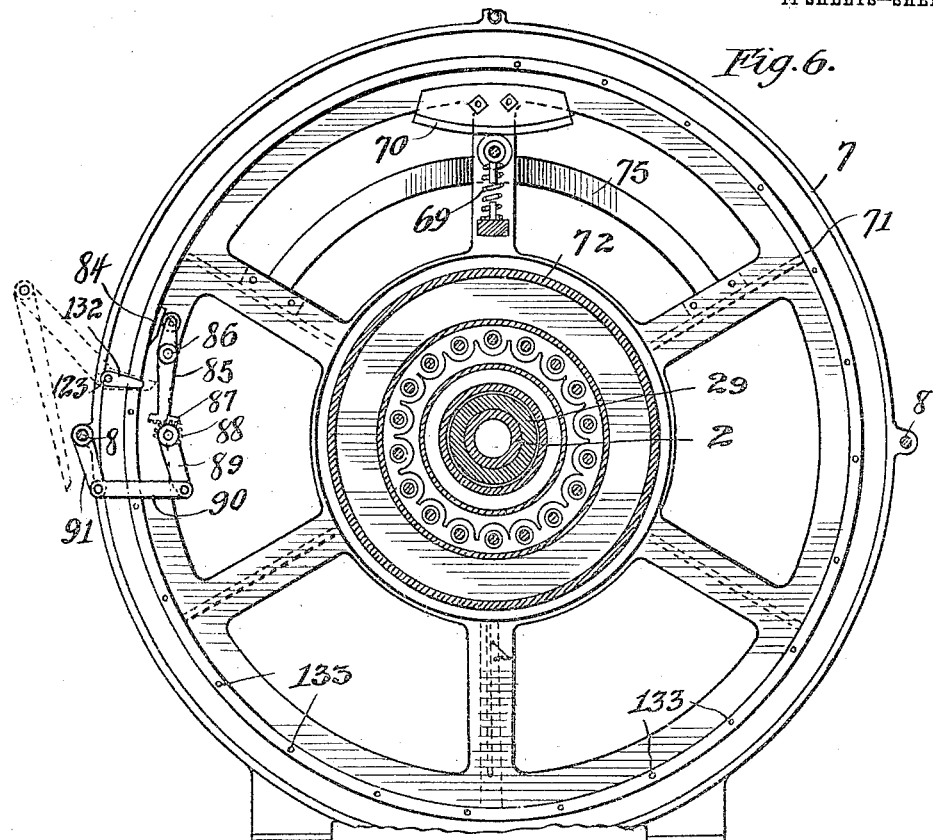

T. D. KYLE & E. H. WAUGH.
MACHINE FOR WASHING AND DRAINING SOILED BOTTLES.
APPLICATION FILED AUG. 17, 1907.
957,220.
Patented May 10, 1910.
11 SHEETS—SHEET 1.
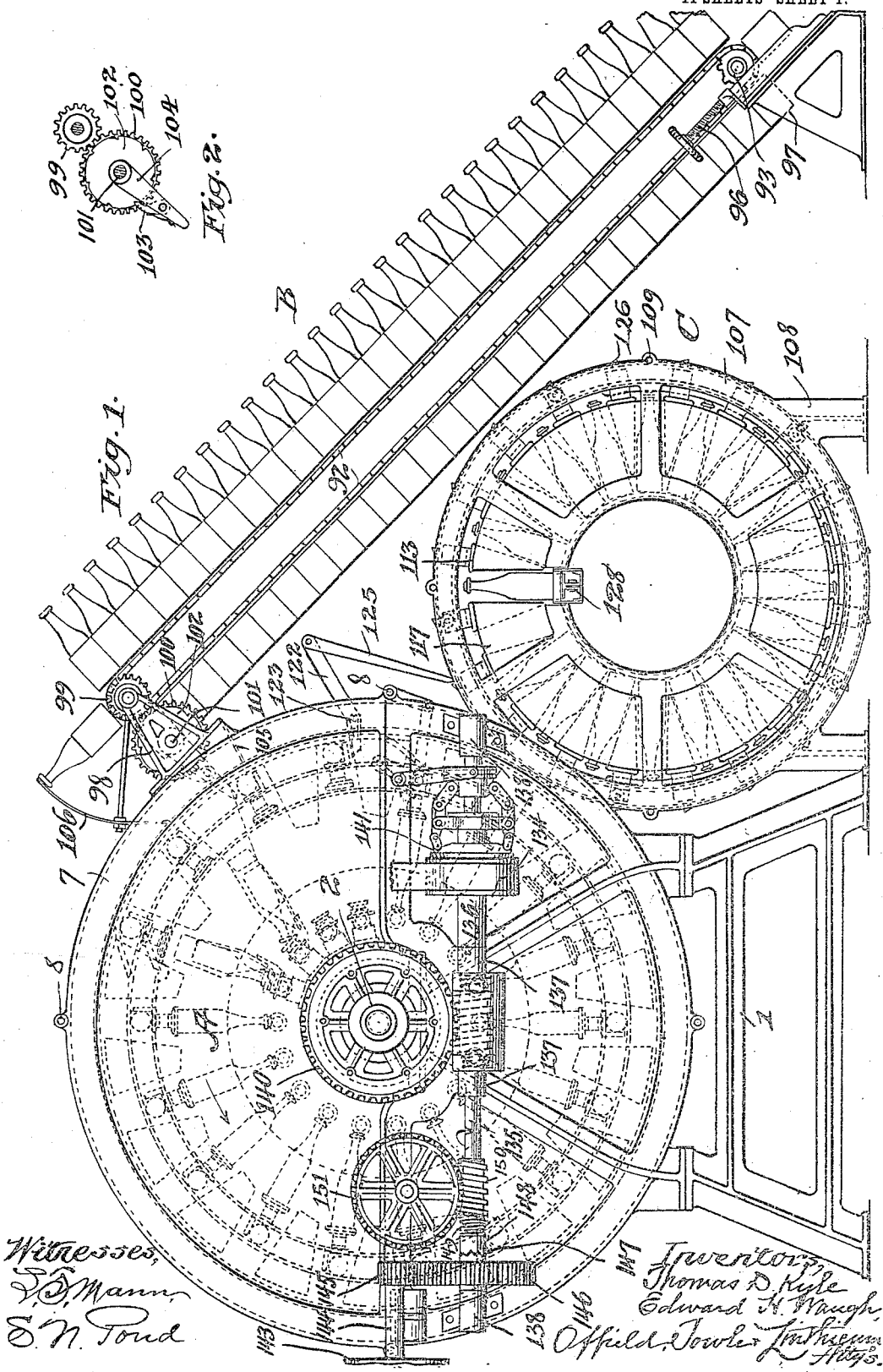

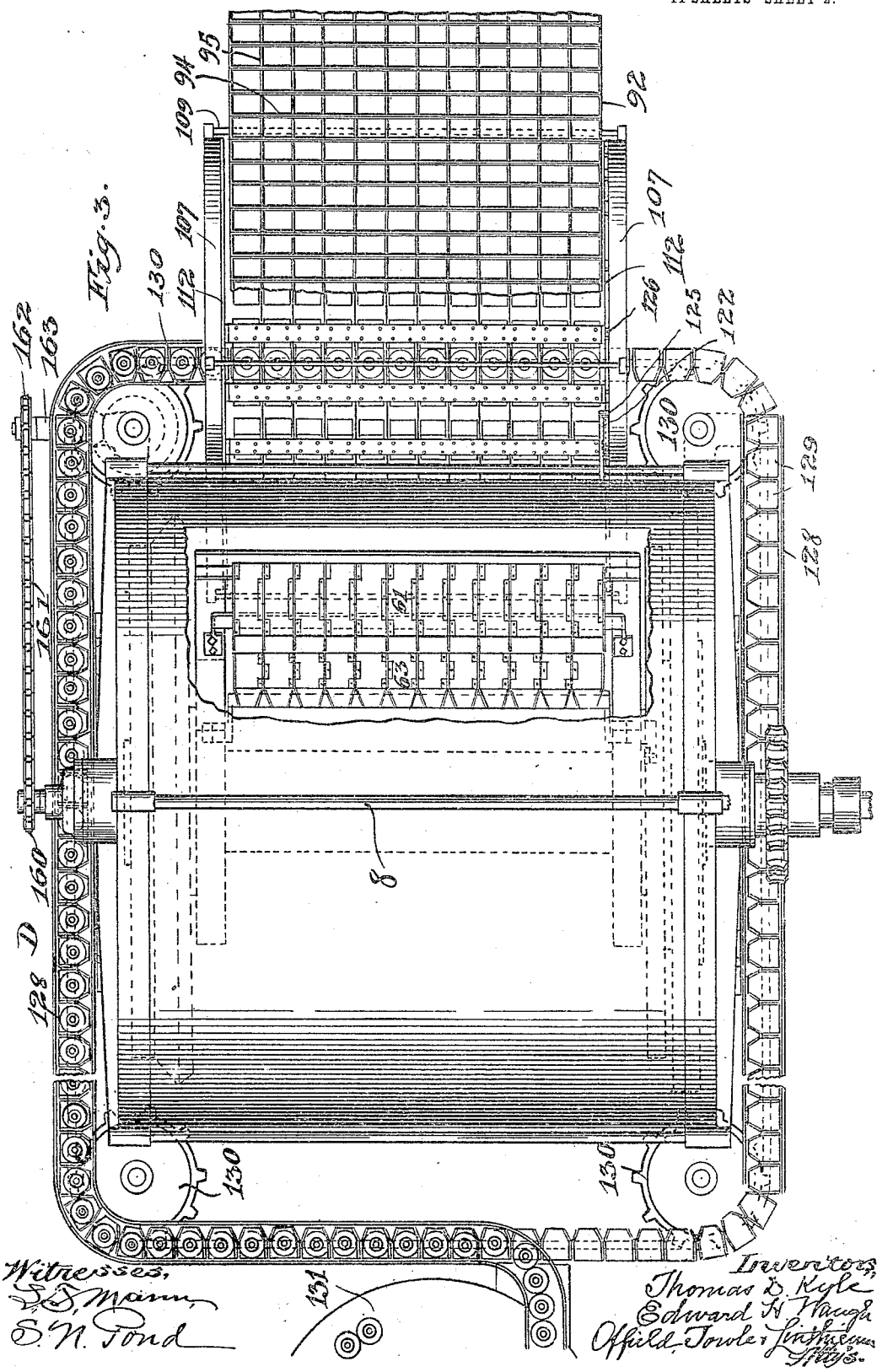

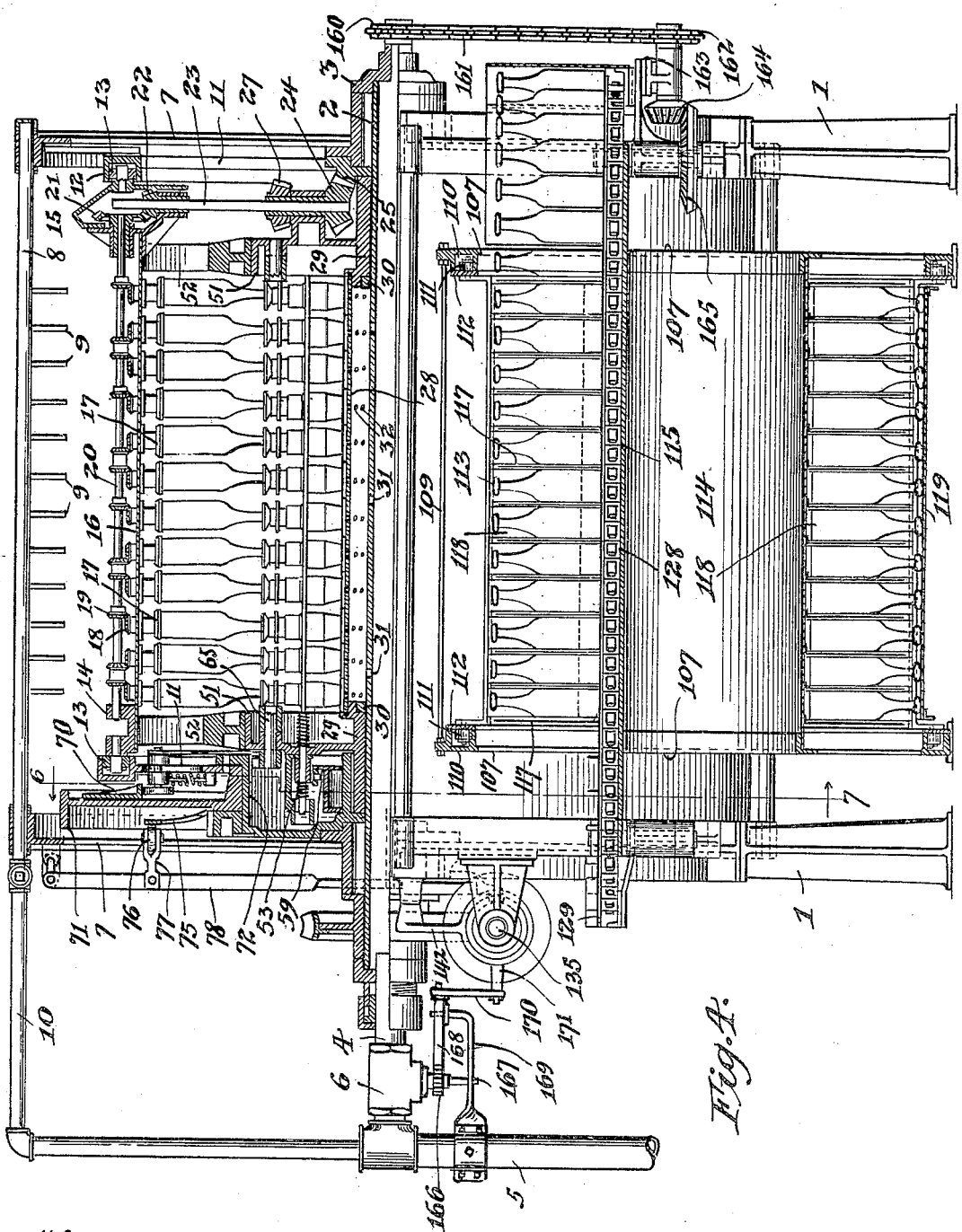

T. D. KYLE & E. H. WAUGH.
MACHINE FOR WASHING AND DRAINING SOILED BOTTLES.
APPLICATION FILED AUG. 17, 1907.
957,220.
Patented May 10, 1910.
11 SHEETS—SHEET 4.
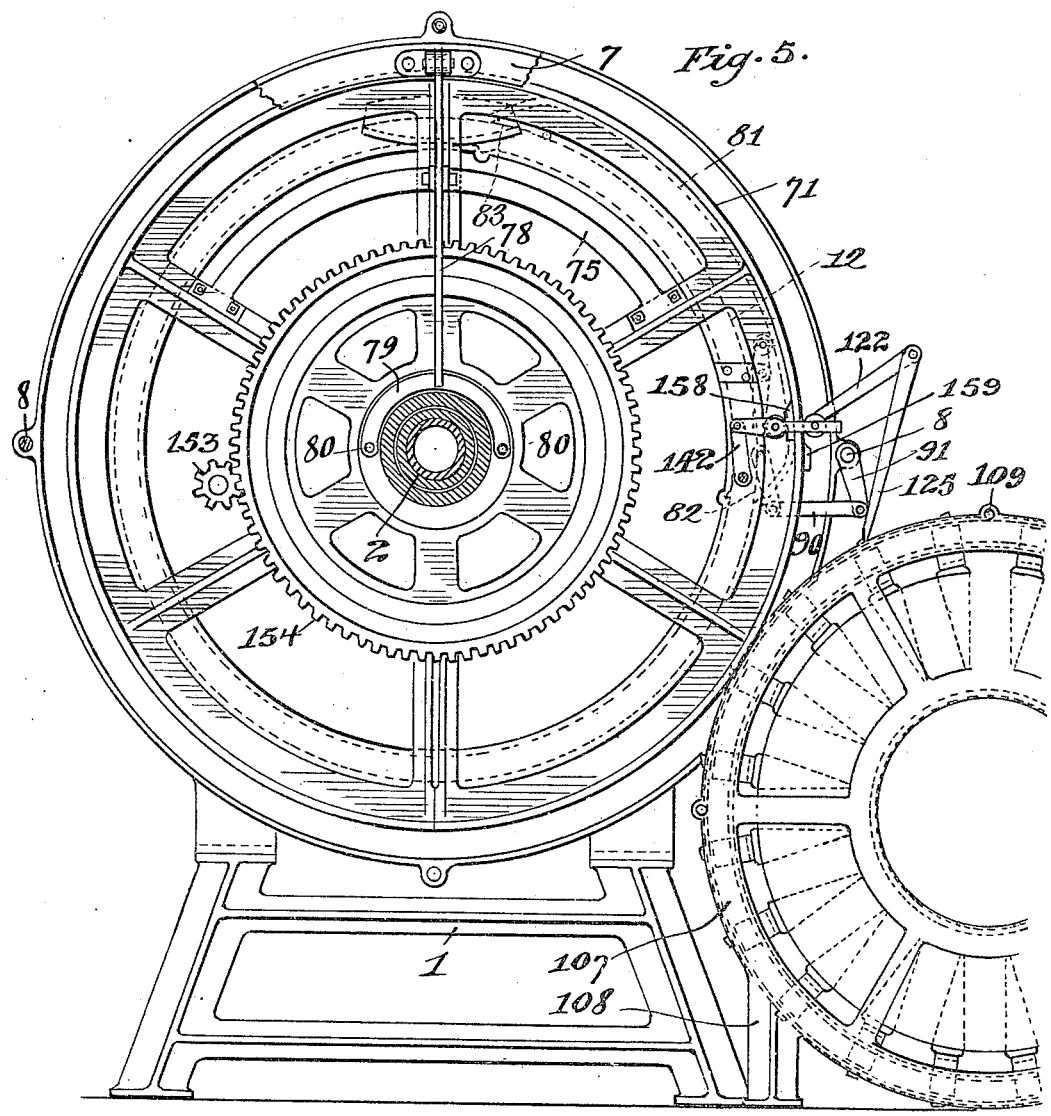
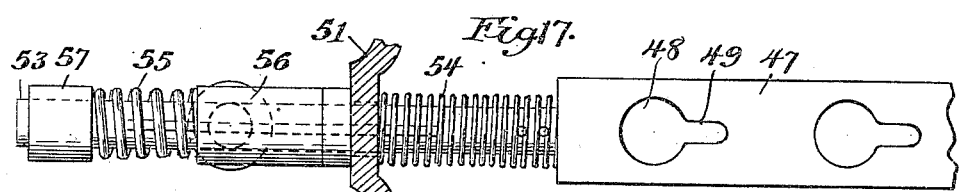
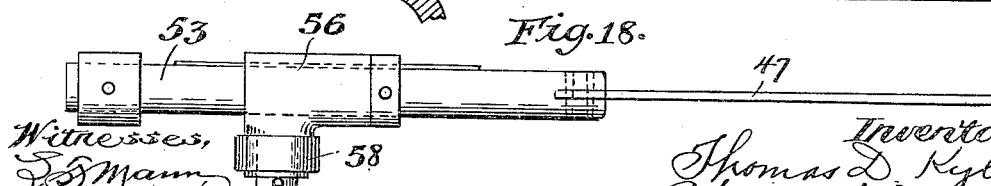

T. D. KYLE & E. H. WAUGH.
MACHINE FOR WASHING AND DRAINING SOILED BOTTLES.
APPLICATION FILED AUG. 17, 1907.

957,220.

Patented May 10, 1910.

11 SHEETS—SHEET 5.

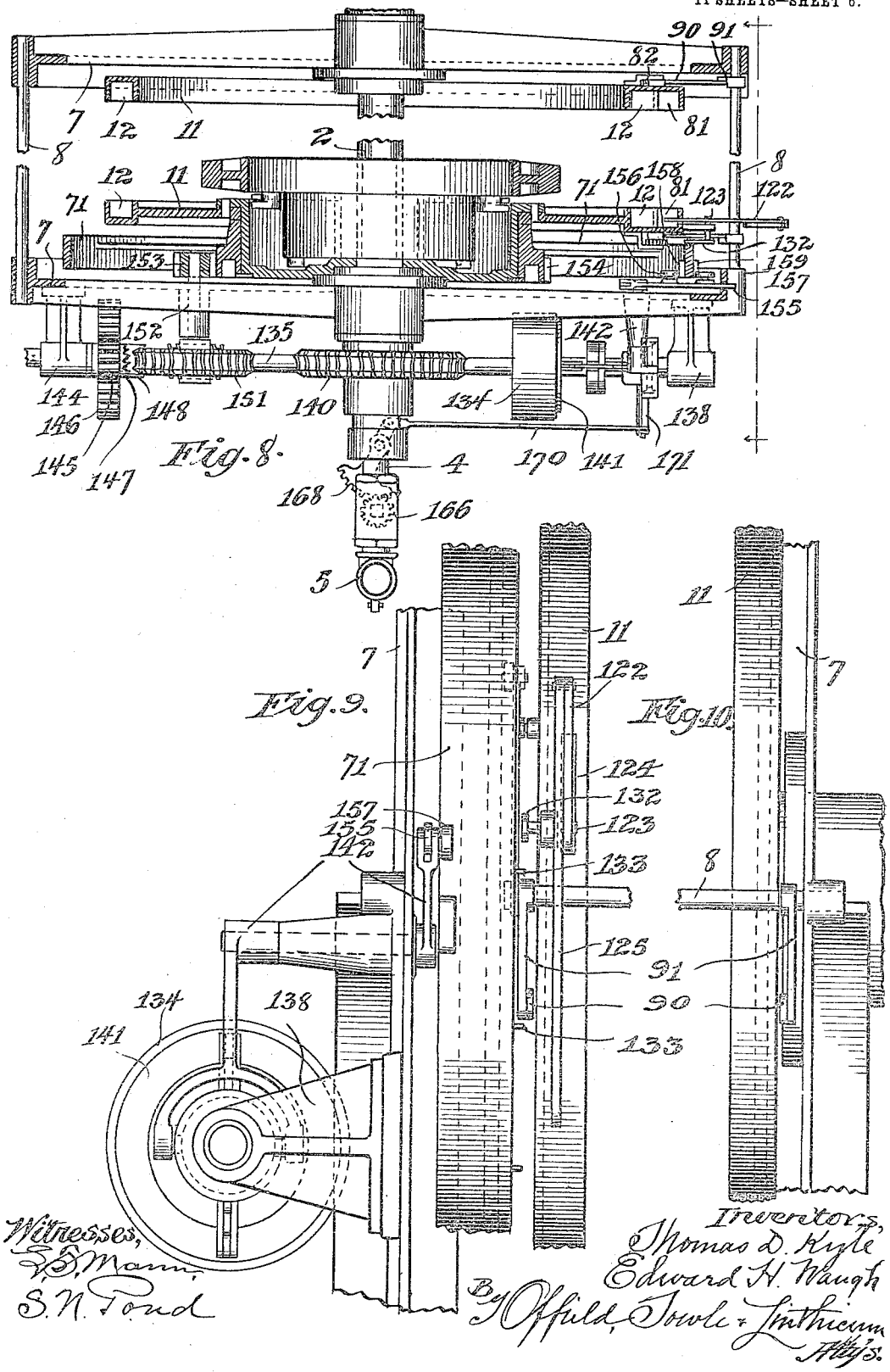

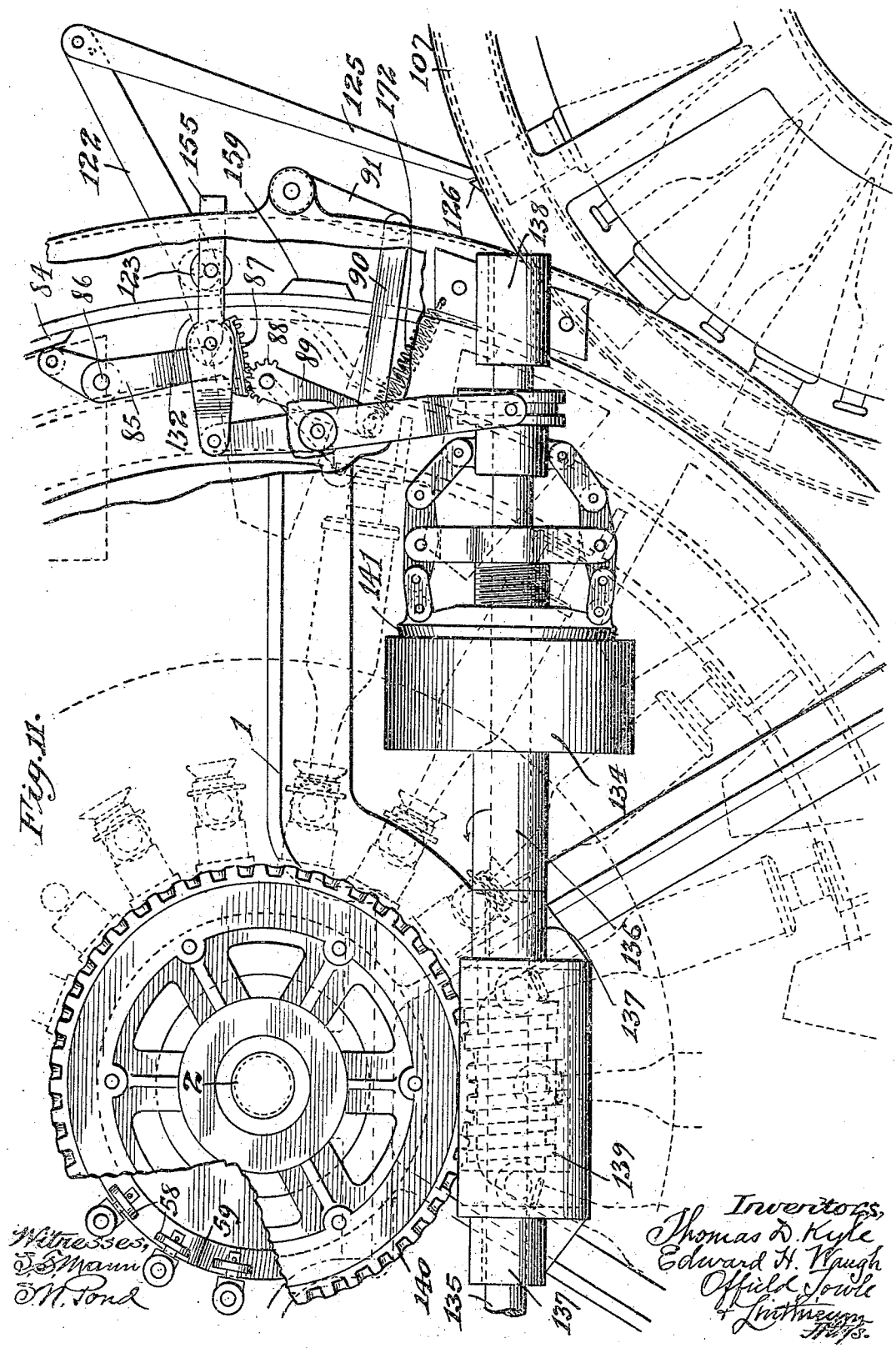

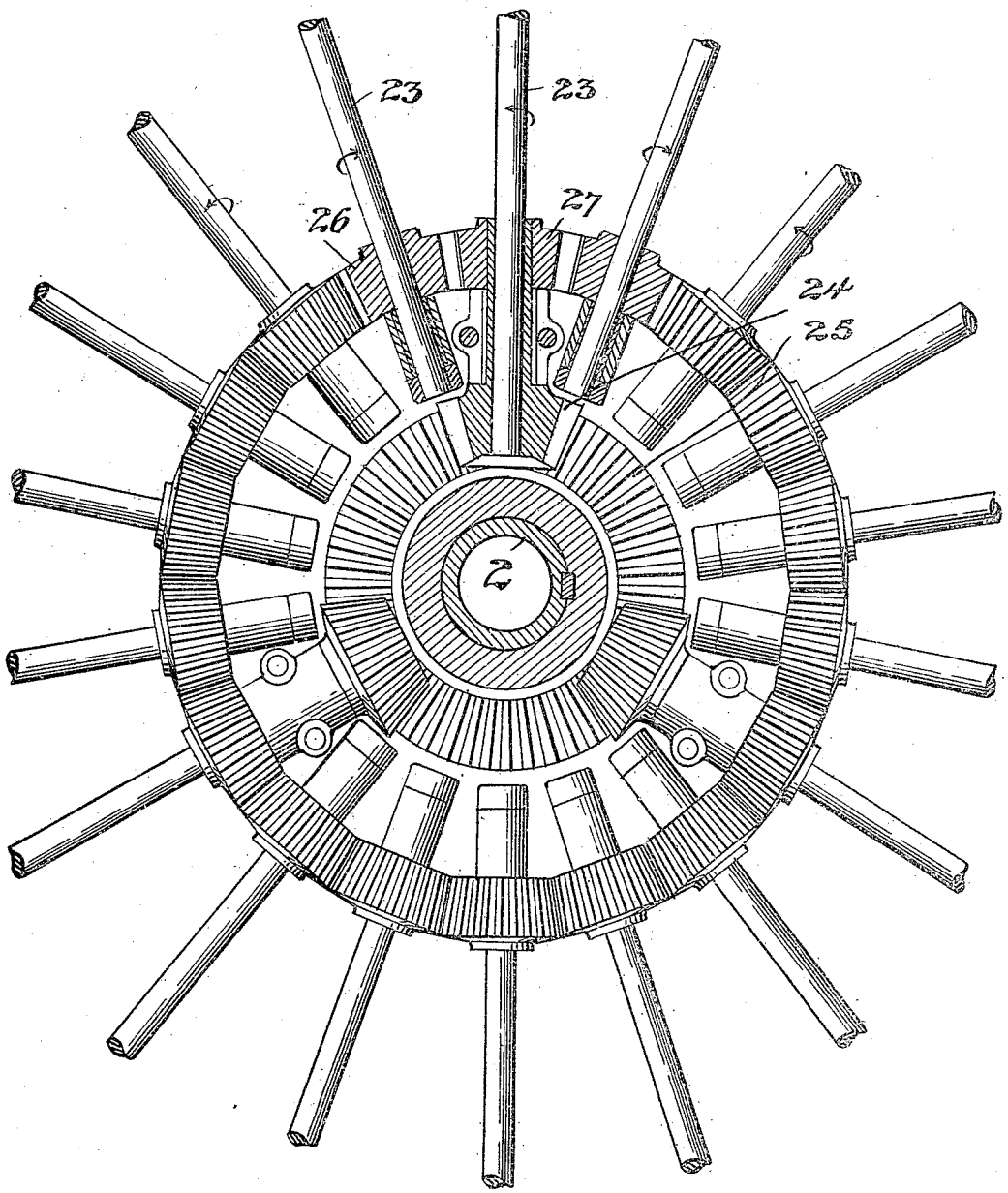

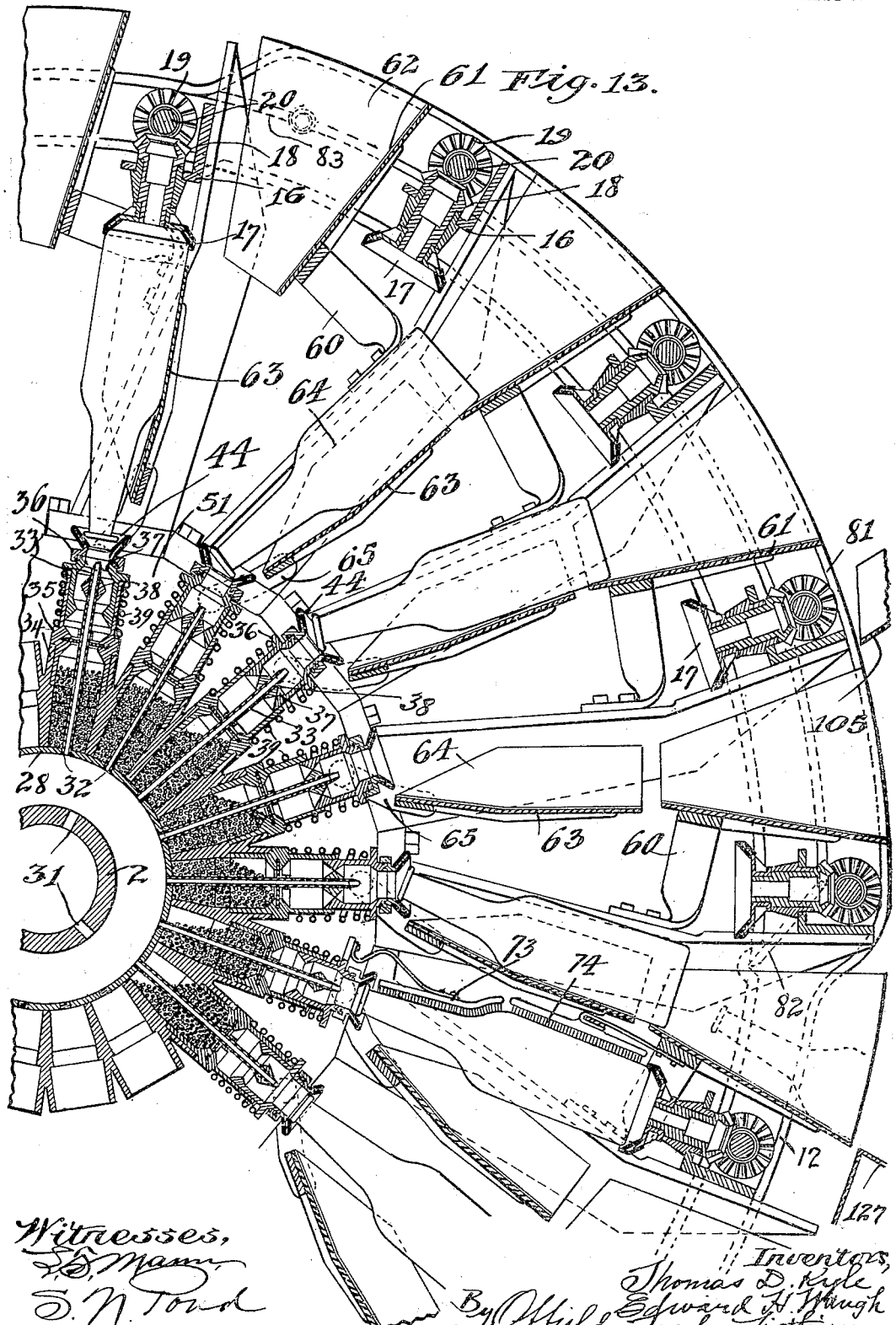

T. D. KYLE & E. H. WAUGH.
MACHINE FOR WASHING AND DRAINING SOILED BOTTLES.
APPLICATION FILED AUG. 17, 1907.
957,220.
Patented May 10, 1910.
11 SHEETS—SHEET 10.
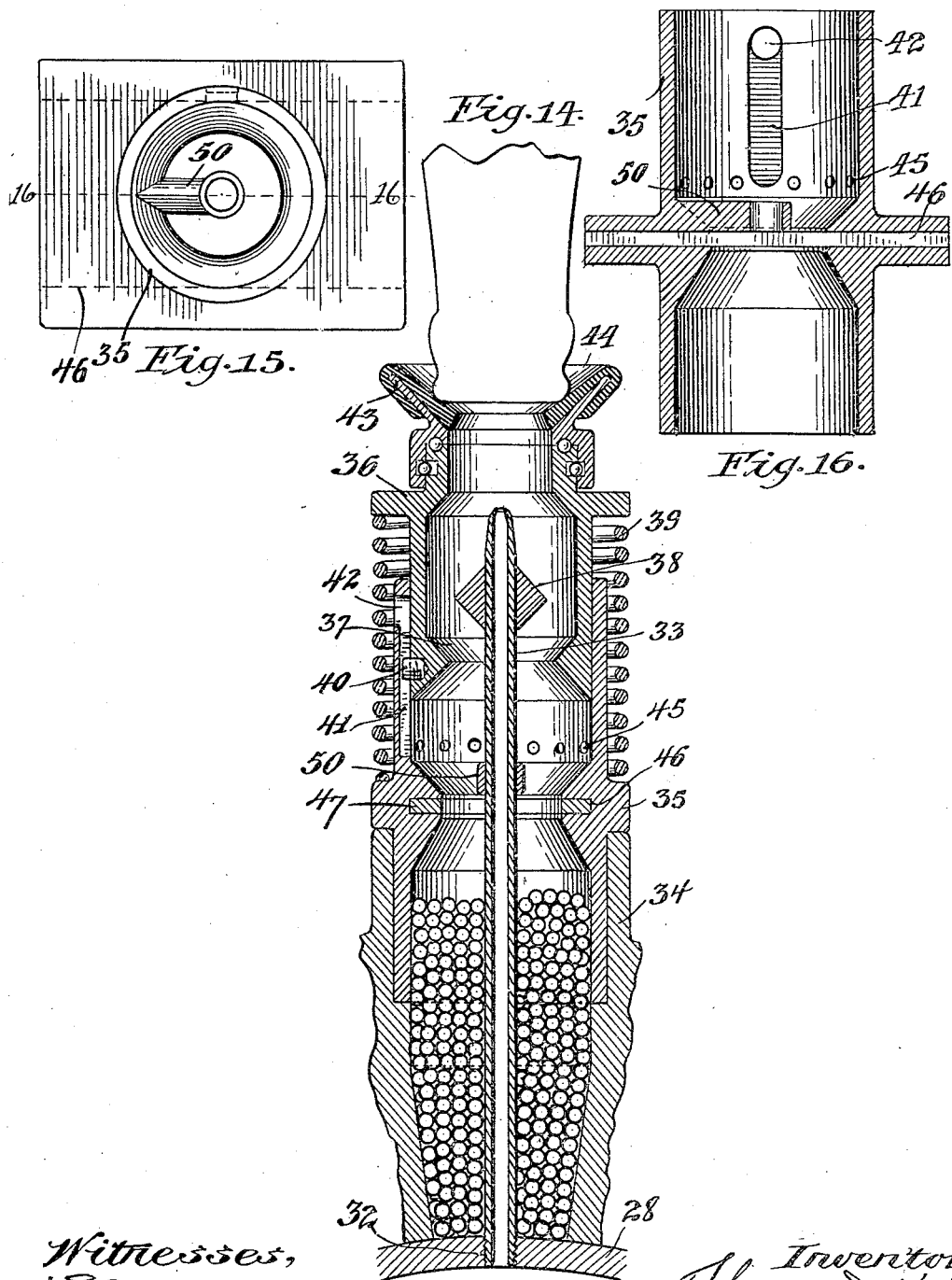

T. D. KYLE & E. H. WAUGH.
MACHINE FOR WASHING AND DRAINING SOILED BOTTLES.
APPLICATION FILED AUG. 17, 1907.

957,220.

Patented May 10, 1910.
11 SHEETS—SHEET 11.

UNITED STATES PATENT OFFICE.

THOMAS D. KYLE, OF CHICAGO, AND EDWARD H. WAUGH, OF EVANSTON, ILLINOIS; SAID WAUGH ASSIGNOR TO SAID KYLE.

MACHINE FOR WASHING AND DRAINING SOILED BOTTLES.

957,220.

Specification of Letters Patent.

Patented May 10, 1910.

Application filed August 17, 1907. Serial No. 388,998.

*To all whom it may concern:*

Be it known that we, THOMAS D. KYLE and EDWARD H. WAUGH, both citizens of the United States, residing, respectively, at Chicago, in the county of Cook and State of Illinois, and at Evanston, in the county of Cook and State of Illinois, have invented certain new and useful Improvements in Machines for Washing and Draining Soiled Bottles, of which the following is a specification.

This invention relates to the art of bottle-washing machinery; and has for its main object the production of an organized machine of large capacity and rapid action, capable of washing the bottles both inside and outside, including the removal of old labels, automatically effecting the introduction of the soiled bottles to and the withdrawal of the cleaned bottles from the washing mechanism proper, and also effecting the drying or draining of the cleaned bottles and their withdrawal from the machine.

The complete machine of our invention comprises as its main and essential elements, first, a washing mechanism proper; second, a feeding-in conveyer for the soiled bottles automatically controlled and actuated as to its movements in properly timed relation to the movements of the washing mechanism; third, a draining or drying mechanism in which the cleaned bottles are received from the washing mechanism and thoroughly drained; and, finally, a discharging conveyer controlled and operated in properly timed relation to the draining or drying mechanism.

Our invention also embraces numerous detail improvements, especially in the mechanism whereby the reception of the soiled bottles from the feeding-in conveyer and the discharge of the cleaned bottles to the drying mechanism is rendered entirely automatic.

The machine of our invention is designed primarily for use in breweries and other similar large bottling establishments wherein the cleaning of the bottles rapidly, thoroughly, and on a large scale, is essential; and to this end the machine has been rendered almost entirely automatic in its character so as to be capable of manipulation by a single operator, necessitating in addition only a sufficient force of attendants to keep the feeding-in conveyer supplied with soiled bottles during the operation of the machine.

Our invention, in many of its specific details, is capable of wide variation and modification within the knowledge and skill of the mechanic familiar with the art to which it relates; but in the accompanying drawings and the following description we have disclosed one practical embodiment of the invention in a mechanical form found to operate satisfactorily and secure the results sought to be obtained by the invention.

Figure 7:
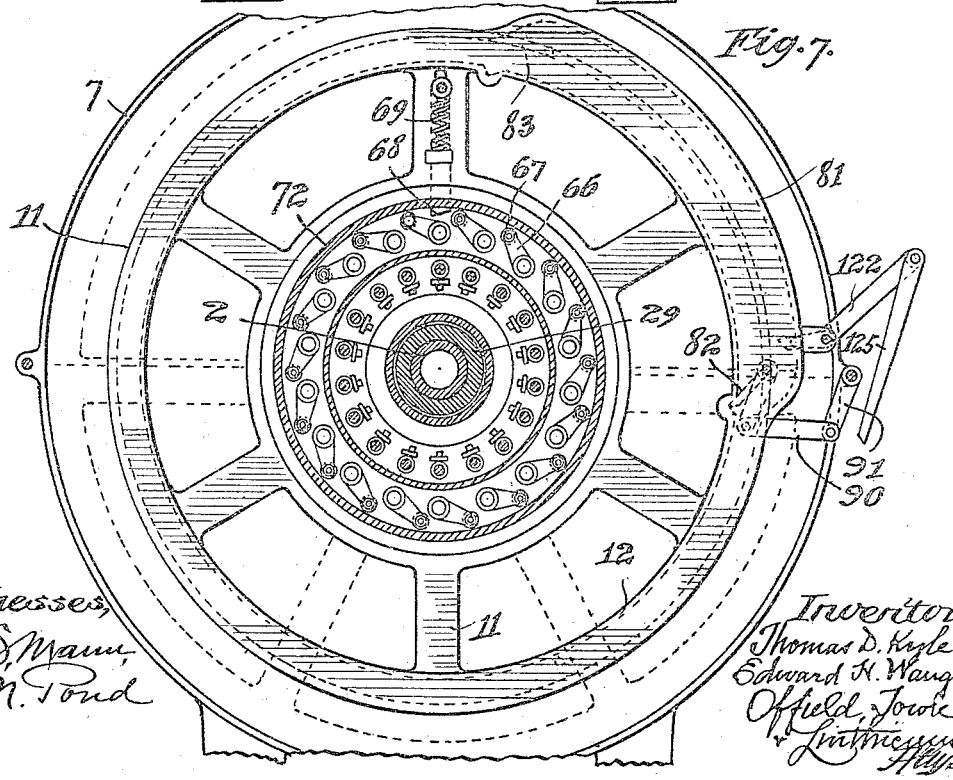
Figure 19:
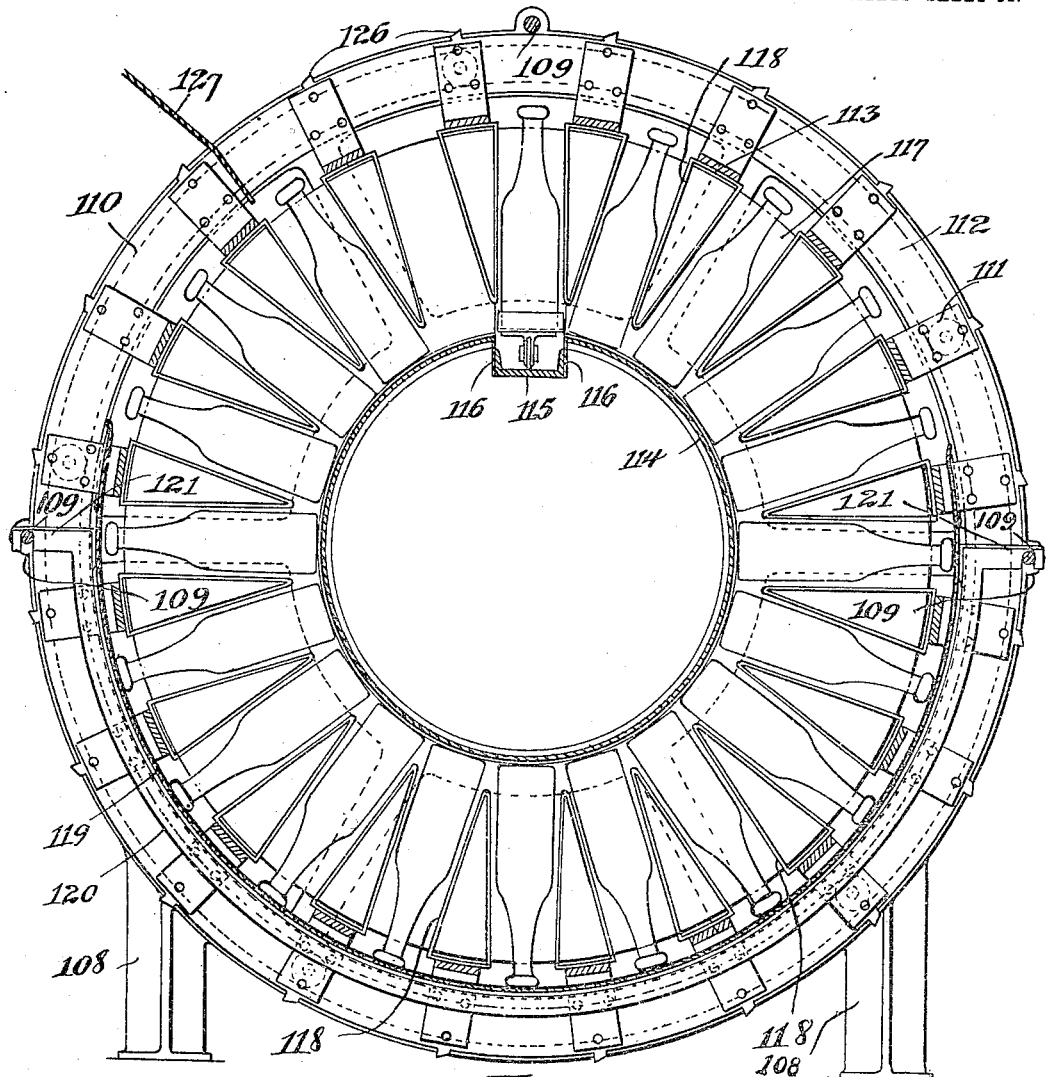

Referring, therefore, to the accompanying drawings,—Figure 1 is a general side elevational view of the complete machine, parts being broken away and minor details omitted for the sake of clearness. Fig. 2 is a detail view of a part of the mechanism for automatically operating the feeding-in conveyer from the rotary movement of the bottle-washing machine. Fig. 3 is a general plan view of the machine with parts broken away and some details omitted for the sake of clearness, and more particularly illustrating the arrangement of the discharge conveyer. Fig. 4 is a front end view of the machine, omitting the feeding-in conveyer and in vertical section through the driving mechanism and the upper half of the washing mechanism; Fig. 5 is an end elevation of the washing and draining mechanism, partly in vertical section and partly broken away. Fig. 6 is a sectional elevation substantially on the line 6—7 of Fig. 4, viewed in the direction indicated by the upper arrow. Fig. 7 is a similar sectional elevation substantially on the line 6—7 of Fig. 4, viewed in the direction indicated by the lower arrow. Fig. 8 is a sectional plan view of the opposite end portions of the washing mechanism, the intermediate portion being broken away and parts omitted. Figs. 9 and 10 are enlarged details in edge elevation, showing principally the automatic mechanism for actuating the draining device from the rotary motion of the bottle-washing mechanism. Fig. 11 is an enlarged fragmentary detail elevation of adjacent portions of the washing and draining or drying mechanisms, more particularly illustrating the driving means for the washing mechanism and the automatic driving mechanism of the drier. Fig. 12 is an enlarged detail view, partly in section, of the gearing for imparting rotary movement to the bottles while carried by the washing mechanism. Fig. 13 is an enlarged sectional detail through the mechanism for guiding the soiled bottles into the bottle-holders of the washing mechanism and also through the central series of inner bottle-holders and shot-boxes. Fig. 14 is a detail in longitudinal section of one of the inner bottle-holders and shot-boxes. Fig. 15 is an end view of the inner member of the shot-boxes. Fig. 16 is a cross-sectional view on the line 16—16 of Fig. 15. Fig. 17 is a detail plan view, broken away, of the valve-bar controlling the shot-boxes. Fig. 18 is an edge view of Fig. 17. Fig. 19 is an enlarged cross-sectional view through the drying mechanism.

Referring first to the general views, Figs. 1 and 3, the principal coöperating agents or members of the organized machine comprise, as entireties, a bottle-washing mechanism, which we have designated as a whole by A, a feeding-in conveyer designated as a whole by B, a draining mechanism in which the bottles are dried, designated as a whole by C, and a discharge conveyer for the cleaned and dried bottles, designated as a whole by D. To facilitate an understanding of the general relations of these parts, it may be stated at the outset that the washing mechanism is designed to be continuously and uninterruptedly driven; the speed being considerably slowed down during the loading and unloading of the washing mechanism, but driven at a relatively rapid speed during the washing and scouring of the bottles. For this purpose the drive-shaft of the washing mechanism is equipped with two sets of driving gears, one designed for rapid speed and the other for slow speed, as will be more particularly hereinafter pointed out.

In describing the several main parts or agencies of the machine, we will first describe the washing mechanism proper, which comprises as to its essential features an axially hollow shaft through which the cleansing fluid is introduced, this shaft having a series of rows of radially disposed combined shot-boxes and inner bottle-holders, and a skeleton drum or spider carrying near its peripheral portion corresponding rows of outer bottle-holders adapted to be automatically moved inwardly and outwardly to engage and release the bottles at the proper times. This bottle-carrier is rotatably mounted in a semi-cylindrical washing tank, its rotation through the latter when partly filled with the cleansing fluid serving to cleanse the exteriors of the bottles and removing old labels therefrom, while a series of valve-bars passing through the inner bottle-holders and controlled by a cam operate to admit a scouring agent, such as shot, to the interiors of the bottles during their rotation. Mechanism is also provided for effecting an individual rotation of each bottle on its own axis while it is being carried around by the rotary carrier, suitable brushes being also applied to the exterior surfaces of the individual bottles to render the rotation of the bottles effective for the removal of labels and dirt.

Coming now to a more detailed description of the washing mechanism proper, 1 may designate each of a pair of stationary parallel side-frame members in and between which the rotary parts of the washing machine are carried. In the upper ends of these side-frame members is journaled a hollow or tubular shaft 2, closed at one end as by a cover 3, while its other end is entered by a horizontal branch 4 of a supply-pipe 5 leading from a suitable source of fluid adapted for cleansing purposes, such as pure water or water containing soap or soda in solution, or other cleansing agent. The branch 4 is provided with a valve 6 automatically controlled in the manner hereinafter described.

Secured to the stationary uprights 1 are a pair of circular skeleton frame-members 7 connected and spaced at intervals by tie-rods 8, the uppermost of which may be tubular in form and provided with a series of depending nozzles 9 by which the parts of the machine may be cleaned after a considerable period of use, the tube 8 continuing in the form of a supply-pipe 10 to the main supply-tube 5, as plainly shown in Fig. 4. Inside of the outer frame-members 7, and concentric therewith, are a pair of stationary guide-rings 11, the inner opposed faces of which are formed with annular guide-grooves 12 (see Fig. 8), said grooves receiving rollers 13 on the outer edges of bearing brackets 14 and 15, which brackets are rigidly connected by an angle-bar 16. Each angle-bar has mounted therein a row of outer rotatable holders 17 designed to engage and to hold the butt ends of the bottles during the washing. Means are provided for imparting rotation on their own axes to these holders, the means herein shown comprising bevel pinions 18 on the outer ends of the holders engaging coöperating pinions 19 on a shaft 20 that is journaled at its ends in the brackets 14 and 15. The bracket 15 is hollow and contains a bevel gear 21 on the shaft 20 that is driven by a coöperating bevel pinion 22 splined on a radial shaft 23. Certain of the shafts 23 are provided on their lower ends with bevel pinions 24 (see Fig. 12) that engage a stationary bevel gear 25 fast on the end frame-member 7; while other of the radial shafts 23 carry bevel gears 26 intermeshing with each other and with bevel gears 27 fast with the inner bevel gears 24, whereby the rotary movements imparted to the inner bevel gears 24 are transmitted through the gears 27 and 26 to the several intermediate shafts 23 that do not extend inwardly far enough to be geared to the stationary gear 25.

Surrounding the central tubular shaft 2, and spaced therefrom is another tubular shaft or drum 28, the ends of the latter being fitted onto annular bearings 29 supported on the tube 2, the joint between said tube and bearings being packed by suitable rings 30 to prevent leakage. Both the inner tube 2 and the surrounding tube or drum 28 are provided with radial apertures, as indicated at 31 and 32. Screwed into the apertures 32 are a series of water-inlet tubes 33 that are co-axial with a corresponding series of combination shot-boxes and inner bottle-holders shown clearly in the detail views, Figs. 14, 15 and 16. Each of these latter comprises a shot-box proper mounted on and radially of the drum 28 and made in two interfitting parts 34 and 35 for convenience in casting, and a telescoping bottle-holder member 36, the latter having in part an additional function to control the shot and prevent escape of the latter when the holder happens to be empty, for which latter purpose it is provided with an internal valve-seat 37 that coöperates with a valve 38 on the water-inlet tube 33. The member 36 is normally pressed outwardly by an enveloping coil spring 39, the outward travel of said member being limited by a stop-pin 40 engaging a longitudinal groove 41 in the wall of the member 35, which stop-pin is conveniently insertible through a hole 42 at the upper or outer end of the groove. The outer end of the holder-member 36 is provided with a mouth-piece 43 preferably having an anti-friction bearing thereon, as indicated, said mouth-piece being flaring and preferably provided with a rubber covering 44 to protect the mouth of the bottle from injury. The member 35 is provided, inwardly of the valve-seat 37, with an annular row of holes 45 to permit of the escape of the water returned from the bottles; and inwardly of said row of holes the several members in each longitudinal row are provided with registering slots 46 that accommodate a valve-bar 47; which latter, as will be seen by the detail views Figs. 17 and 18, is provided at intervals, corresponding with the spacing of the several shot-boxes of each row, with holes 48, continuous with which latter are short slots 49, these latter being designed to accommodate the water tubes 33 when the valve-bar is moved to close the shot-box. The water-inlet tubes 33, in addition to being secured at their inner ends in the drum 28, may also be guided and supported in an apertured tongue 50 projecting inwardly of the casting 35 just outside of the slot of the valve-bar, said tongue 50 also serving to cover the slots 49 when the shot-boxes are closed. Inside the stationary guide-rings 11 and fast with the central shaft 2 through the bearings 29 which constitute the hubs thereof, are a pair of circular spiders 51, to which latter are secured, as best shown in the detail view Fig. 17, a series of radial arms 52 corresponding in number with the several longitudinal rows of inner bottle-holders, to the outer ends of which arms are gibbed the several angle-bars 16 carrying the rotatable outer bottle-holders 17. Valve-bars 47 are each provided with a stem 53 that is slidable through a suitably packed aperture in one of the spiders 51, and is provided with a coil spring 54 that normally tends to thrust the valve-bar into open position relatively to the shot-boxes, having an abutment against the inner face of the spider 51, as clearly shown in Fig. 17. The end portion of the stem projecting outside of the spider is preferably encircled by another spring 55 abutting against a roller bracket 56 and a collar 57 on the outer end of the stem; the function of the spring 55 being simply to cushion the valve-bar and permit it to yield slightly in case of an obstruction to its free movement in the shot-box. The roller bracket 56 is provided with a roller 58 that engages a circular cam 59 surrounding the central axial tube 2 (see Fig. 11). The purpose of this cam is to admit the shot into the bottles directly after the machine is loaded and to exclude the same by shutting the valves during two-thirds of the revolution of the machine proper and after two-thirds of the washing period has elapsed. For this purpose the cam 59 is made slidable between an operative and an inoperative position and is automatically shifted between such positions by mechanism hereinafter described.

Referring once more to the detail view Fig. 13, each of the arms 52 is provided with a bracket 60 that supports a relatively stationary slide-plate 61; adjacent slide-plates in the same row being separated by partitions 62. The slide-plates 61 first receive the soiled bottles from the feeding-in conveyer, and guide them into a corresponding series of tiltable slides 63 having corresponding spacing blades or partitions 64. The tiltable slide-plates 63 are carried on crank-arms 65 that are pivoted in the spiders 51 and are each provided with an actuating crank-arm 66 on the outside of the spider (see Fig. 7), said actuating crank-arms each carrying an anti-friction roller 67 that is adapted to engage a slidable cam projection 68 mounted in and radially of the stationary guide-ring 11. The cam projection 68 is maintained normally retracted by a spring 69, but is adapted to be forced inwardly so as to engage the rollers 67 by a cam-block 70 on a slowly rotating master cam-wheel 71; said master cam being rotatably mounted on a large bearing 72 secured to the end frame-member 7 and extending inwardly concentric with the axis of the bottle-carrier. The purpose or function of the tiltable guide 63 is to enable the bottles to be received past the outer bottle-holders 17, and to subsequently tilt the bottles up into alinement with and between the inner and outer bottle-holders preliminary to the engagement of the bottles by the latter. Between the inner and outer holders are suitably mounted brushes 73 and 74 (Fig. 13) adapted to engage the neck portion and body of the bottles, respectively; said brushes also serving to steady and cushion the bottles as they are thrown up into operative position relatively to the holders by the tilting guides or saddles 63. The cam protection 68 is so located relatively to the movable parts coöperating therewith that the several tilting guides 63 will be actuated in succession immediately after the soiled bottles have been received thereby; the guides immediately falling away from the bottles after having performed their function.

Referring once more to the shot-valves and their actuating means, 75 designates an arc-shaped cam secured to and between adjacent spokes of the master cam-wheel 71 (see Figs. 5 and 6), which cam is adapted to engage a roller 76 carried by a bracket-arm 77 on a pivoted lever 78 (Fig. 4), the lower end of which lever has a fork 79 (Fig. 5) straddling the central shaft and provided with pins 80 connected to the cam 59, whereby said cam is automatically moved outwardly a short distance into operative relation to the valve-bars controlling the shot at the proper periods in the operation of the machine. The spring 54 serves to return the cam 59 to a non-operative position.

In order to release the cleaned bottles, as well as to permit the introduction of the soiled bottles, the outer rows of bottle-holders 17 are bodily moved outwardly and inwardly of the carrier at the proper intervals; the mechanism for effecting such movement consisting essentially in the provision of a suitably located cam-track or groove 81 lying just outside the main groove 12 and extending through approximately 90 degrees. The ends of the cam-groove 81 merge into the main groove 12, and the junction between the two is controlled by pivoted switches 82 and 83 (Fig. 7). When the said switches are thrown to the positions indicated in Fig. 7, the outer groove 81 is placed in communication with the main channel 12 so that the carrying rollers of the holder-supporting bars are switched outwardly, thereby releasing the cleaned bottles and preparing the holding devices for the subsequent introduction of the soiled bottles. When the bottle-carrier has been loaded, however, the switches 82 and 83 are thrown to a position in which they close the track 81, and consequently the holder-carrying bars are carried past the same during the rotation of the carrier in the washing operation. The switch 83 controlling the upper or discharging end of the cam-track 81 is normally spring-actuated to close the track 81 and preserve the continuity of the main track 12; but is easily thrown to the position indicated in Fig. 7 by the wheels of the holder-bars as they emerge from the track 81 into the main track 12. The switch 82 controlling the entrance end of the track 81 is positively actuated in an automatic manner by the following means. On the master cam-wheel 71 (Fig. 6) is a cam projection 84 adapted to contact with the shorter arm of a lever 85 that is pivoted at 86 to the stationary ring 11. The longer arm of said lever carries a short segment gear 87 meshing with a pinion 88 on the pivot shaft of the switch 82. To actuate the corresponding switch 82 on the opposite side of the machine, the above shaft of the switch 82 has an arm 89 connected by a link 90 with a corresponding arm 91 on one of the tie-rods 8 (which constitutes in this instance a rock-shaft), the opposite end of said rock-shaft having an arm and link connection corresponding to the parts 91 and 90 with the pivot of the opposite switch 82, as indicated in Fig. 8. A tension spring 172, best shown in Fig. 11, is connected to the arm 89 in a manner to oppose the action of the cam 84 and consequently close the switch 82 across the entrance to the cam track 81 after the cam 84 has ceased to engage the lever 85.

Referring next to the mechanism for delivering the soiled bottles to the washing mechanism, which mechanism is principally shown in Figs. 1 and 3, 92 designates an endless chain conveyer that is mounted on upper and lower sprockets indicated at 93, and carries a plurality of transverse rows of cells formed by transverse and longitudinal partition-plates 94 and 95, respectively, said cells being designed to hold bottles set therein by an attendant in the manner clearly indicated in Fig. 1. The several transverse rows of cells are independently connected to the conveyer chains to provide the necessary flexibility in rounding the ends of the latter, and the chains may be properly tensioned by a take-up indicated at 96 in Fig. 1. The lower end of the conveyer may be mounted in suitable bed-blocks 97, while its upper end is supported in and between brackets 98 secured to the main stationary side-frames 7 of the washing apparatus. The conveyer is intermittently and automatically actuated from the rotary movement of the bottle-carrier of the washing mechanism by pawl and ratchet connections shown in Fig. 1 and in detail in Fig. 2, such connections comprising a small gear 99 keyed on the upper shaft of the conveyer engaged and driven by a gear 100 supported on a countershaft 101 and journaled in and between the brackets 98, said gear 100 having fast therewith a ratchet-disk 102 that coöperates with and is driven by a spring-pressed pawl 103 pivoted to an arm 104 loose on the counter-shaft 101. The arm 10 extends downwardly across the cam-track 81, passing through a suitable slot in the wall thereof in the plane and path of the rollers 13; so that, as said rollers successively strike the lower end of said arm, the upper conveyer shaft is given a sufficient advance movement through the mechanism described to swing the uppermost row of bottles and bottle-cells over the upper end of the conveyer and thereby bring the row of bottles into downwardly inclined and discharging position, in which they readily slide by gravity out of the cells, over an intermediate stationary inclined slide 105 (see Fig. 13), onto the fixed slide 61 carried by the rotary bottle-carrier, whence they slide farther into the tilting saddle 63 by which they are subsequently thrown upwardly into position to be engaged by the inner and outer bottle-holders by the mechanism previously described. In order to prevent premature slip of the bottles from their cups or cells on the conveyer in rounding the upper end of the latter, a curved guard or shield 106 (Fig. 1) is employed, under which the outer end of the bottles slides, being confined thereby until it has reached the proper discharging position.

Describing next the third coöperating mechanism of the apparatus, which consists of the draining or drying machanism, 107 designates each of a pair of circular skeleton side-frames or spiders, supported on legs 108 and connected at suitable intervals by tie-rods 109, this structure being located conveniently beneath the feeding-in conveyer and directly in front and slightly below the washing apparatus. As shown best in Fig. 4, the inner opposed sides of the circular end-frames 107 are provided with annular grooves or tracks 110 engaged by rollers 111, which rollers are carried by rotatable rings 112 that overlie the inner open sides of the grooves, said rings being connected at close intervals by transverse strips 113.

114 designates a stationary inner drum secured at its ends in said frames 107, which drum is co-axial with the main circular side-frames 107. Said drum 114 is provided on the upper portion of its circumference with an inset track conveniently formed by a channel-beam 115 secured to inwardly turned flanges 116 bent down from the circumference of the drum. Suitably secured to and embracing drum 114, and spaced at intervals corresponding substantially to the diameter of the bottles, are a series of transverse partition rings 117, which rings are continuous except for a space at their upper portion corresponding to the cross-track 115, and extending inwardly radially of the structure are a series of narrow V-shaped partition-members 118, the several longitudinal rows of such partitions being spaced apart approximately the diameter of the bottles, as clearly shown in Fig. 19.

It will be seen that the described construction provides in effect a rotary bottle-carrier provided with a large number of radially disposed cells or pockets for the bottles, having stationary bottoms and fixed sides separating or spacing the bottles of the individual rows, and movable sides separating the several rows of bottles, whereby the several rows of bottles are bodily carried around the axis of the drier, sliding or skidding at their lower ends on the outer surface of the central stationary drum 114, each bottle undergoing a complete inversion during one revolution around the axis of the apparatus. To confine the bottles against falling out during the lower half of the revolution, we provide a semi-circular shield or slide 119, shown in section in Fig. 19, which slide is adapted to engage and support the narrow open ends of the bottles in the manner clearly shown to confine the bottles to their pockets, and is perforated as indicated to permit the drainings from the bottles to readily flow away. This shield is conveniently secured by being mounted on two or more semi-circular ribs 120 having outwardly turned ends 121 that are hung over a pair of opposite tie-rods 109, as clearly shown in Fig. 19.

The draining mechanism above described is automatically actuated from the rotary movement of the washing mechanism. After a load of soiled bottles has been washed, the cleaned bottles are automatically discharged onto the draining mechanism and simultaneously a fresh load of soiled bottles is delivered into the washing mechanism. The drainer has the same bottle-carrying capacity as the washer, so that, when the last row of cleaned bottles has been discharged from the washer, the drier or draining device has just received its full load. In order to discharge the drained bottles from the drier, the movement of the latter is continued during the subsequent washing operation of the washing mechanism. The mechanism for effecting the rotation of the drier to load the same and to subsequently unload the same comprises the following parts.

122 designates an angle-lever pivoted at 123 to a suitable bearing on one of the stationary guide-rings 11 (see Figs. 8 and 9), the inner end of said angle lever projecting through a slot 124 in the outer side wall of the track 81 so as to be in the plane and path of the rollers 13. Pivoted to the outer end of the lever 122 is a long pawl 125, the free end of which is adapted to engage successively ratchet projections or teeth 126 on the circumference of the rings 112 as clearly shown in Fig. 19. From this it will be seen that shortly after the rollers 13 have entered the cam-track 81 and released the bottles by retracting the outer holder, each roller in turn strikes the inner end of the lever 122, thereby rocking the same and, through the pawl 125, imparting a partial turning movement to the rotary member of the drier, sufficient to bring a row of pockets in the latter into register with a delivery guide-plate 127 connecting the movable slide-plate 61 with the periphery of the drier, so that the bottles may readily slide on a practically continuous support from the washer to the drier.

From the foregoing it will be seen that, assuming the capacity of the drier to be equal to or greater than that of the washing machine, by the time the latter has discharged itself of the cleaned bottles, the drier has become loaded, and each row of bottles, during its bodily travel around the central drum of the drier, has had time to be thoroughly drained, the movement of the drier being comparatively slow, corresponding to the slower movement of the washing machine in loading and unloading. It will also be understood that as soon as the unloading movement of the washer has begun, the reloading movement thereof commences as soon as the first empty row of holders comes into receiving position relatively to the feeding-in mechanism. As soon as the drier has been fully loaded, the several rows of bottles carried thereby are successively withdrawn in the same order in which they are received, by the following mechanism.

128 designates as an entirety an endless discharge conveyer, shown principally in the plan view, Fig. 3, said conveyer comprising essentially a series of individual bottle-trays 129 riveted to the chain of the conveyer, which latter is trained and guided around horizontal sprockets 130 located at the four corners of the washing machine. The conveyer chain carrying the trays 128 passes over the countersunk track 115, that extends through and longitudinally of the drier, as clearly shown in Figs. 4 and 19, the motion of said conveyer being continuous with that of the washing mechanism, so that as the successive rows of bottles are brought up and pushed onto the conveyer by the successive intermittent movements of the drier, each row is carried away thereby and may be conveyed off to a suitable filling or other machine suggested at 131 in Fig. 3, or otherwise disposed of.

The unloading of the drier last described takes place after the washing apparatus has been reloaded and during the washing of such subsequent load. Inasmuch as during this latter operation the rollers 13 do not traverse the cam-tracks 81 but move continuously in the circular tracks 12, it becomes necessary to provide other and auxiliary means for continuing the intermittent movement of the drier for unloading purposes; these means, as herein shown, comprising the following.

Referring again more particularly to Figs. 6, 8 and 9, 132 designates a trip fast on the pivot 123, the other end of which trip projects across the path of a series of laterally projecting pins 133 mounted on the inner side of the rim of the master cam-wheel 71; whereby, by the rotation of said cam-wheel, the lever 122 and pawl 125 are intermittently actuated in the manner previously described so as to continue the intermittent rotation of the drier during the subsequent washing movement of the washing apparatus, such actuation of the drier being, of course, in properly timed relation to the continuous movement of the discharge conveyer so that by the time one row of bottles has been carried out of the drier the following row is immediately moved into the succeeding portion of the discharge conveyer.

Referring next to the means whereby the several parts receive power and are driven in properly timed order and relation to each other, 134 designates a driving pulley having a clutch face and loosely mounted on a shaft 135 preferably by means of an elongated hub-bearing 136, said shaft being journaled in intermediate and end bearings 137 and 138, respectively, secured on the outer face of one of the circular side-frames 7 of the washing machine. On the shaft 135 is a worm 139 meshing with and driving a worm-wheel 140 keyed on the central tubular shaft 2, whereby said shaft and the parts fast therewith are positively rotated when the pulley 134 is rendered fast with the shaft 135, for which purpose 141 designates a coöperating clutch-member keyed to the shaft 135 and thrust into and out of engagement with the pulley 134 by a shifting lever 142, automatically actuated in a manner hereinafter described.

The foregoing constitutes the mechanism for imparting a relatively rapid rotation to the bottle-carrier of the washing mechanism employed during the washing of the bottles; the slower rotation employed during the loading and unloading being effected by the following mechanism. Referring to Fig. 1, 143 indicates, in fragmentary view, a driving pulley on a short shaft journaled in a bearing 144 carried by the side-frames 7, said shaft carrying at its opposite end a pinion 145 meshing with a gear 146 loose on the shaft 135 and provided with a hub having radial ratchet-teeth 147 coöperating with a similarly toothed sleeve 148 feathered on the shaft 135 and normally impelled into engagement with the toothed hub of the gear by a spring 149 between said sleeve and the adjacent end of a worm 150 also fast on shaft 135. Worm 150 engages and drives a worm-wheel 151 on a transverse shaft 152 (Fig. 8), the inner end of said shaft carrying a pinion 153 meshing with a gear 154 (Fig. 5), fast on the master cam-wheel 71. The last described driving connections between the worm 150 and the master cam-wheel 71 are for the purpose of transmitting a greatly reduced speed of rotation to the latter. The rotary bottle-carrier of the washing mechanism is positively driven at the slowest speed from the pulley 143 through the described connections, including the toothed collar 148 during the loading and unloading of the carrier; but as soon as the carrier has received a fresh load of soiled bottles and the washing operation is to be resumed, the clutch 141 is shifted to drive the shaft 135 at a much higher speed from the pulley 134; this operation simply driving the toothed sleeve 148 at a higher speed than the gear 146 and in a backward direction relatively thereto, the teeth idly slipping past each other. Of course, any other equivalent form of clutch permitting an increased speed of the shaft 135 consistently with the slow drive may be employed, if desired.

The change from slow to high speed and vice versa may be automatically effected by the following means. Referring particularly to Figs. 8, 9 and 11, 155 indicates an arm connected at its inner end to the upper end of the shifting lever 142 and slidably supported in a slot in the rim of the end frame 7. Arm 155 carries a pair of laterally projecting rollers 156 and 157, both on the same side of the arm and straddling the rim of the master cam-wheel 71, and contacted by cam projections 158 and 159, respectively, on the inner and outer surfaces of the rim of said cam-wheel, said projections being properly spaced apart to shift the clutch and permit one complete rotation of the bottle-carrier at slow speed before the clutch is again shifted to apply the rapid motion.

The discharge conveyer is conveniently driven from the rotation of the main tubular shaft 2 of the washing mechanism by means of a sprocket 160 on the shaft 2, a sprocket-chain 161 leading therefrom to a sprocket 162 on the short shaft journaled in a suitable bracket 163 (Fig. 4) carrying a bevel pinion 164 meshing with a companion pinion 165 on the upright spindle of one of the horizontal sprockets carrying the discharge conveyer chain.

During that period of operation when the washing machine is being loaded and unloaded it is desirable to cut off the supply of washing fluid through the pipes 5 and 4, and to turn on the supply of such fluid during the bottle-washing movement of the bottle-carrier. This is preferably effected automatically through connections between the cut-off valve 6 in the branch pipe 4 and the clutch-shifting mechanism controlling the clutch-member 141. Referring to Figs. 4 and 8, in which this mechanism is shown, 166 may designate a small circular pinion on the stem 167 of the plug-valve 6, said pinion being engaged and actuated by a segment gear 168 pivoted on a bracket 169 that may conveniently be clamped to the inlet-pipe 5. The short arm of the segment lever 168 is connected by a link 170 with the end of a pin or stud 171 projecting laterally from the fork of the clutch-shifting lever 142. It will thus be seen that when the clutch 141 is shifted to render the driving pulley 134 operative and drive the bottle-carrier at high speed during the washing operation, the valve 6 is automatically opened; and when said lever is reversely shifted preliminary to the loading and unloading operations of the bottle-carrier, said valve is automatically closed and the supply of washing fluid shut off.

The operation of the several constituent mechanisms of the organized machine has already been to a considerable extent explained in connection with the description of the parts; but the operation of the complete mechanism as an organized whole may be briefly described as follows. Assuming that the washing mechanism A has washed one set of bottles and delivered the same to the drier C, and during such delivery has received from the feeding-in conveyer B a fresh load of soiled bottles, the switches 82 will have then been drawn by spring 172 (Fig. 11) to a position closing the cam-track 81. At this point the high speed driving mechanism is placed in commission automatically by the cam projection 159 on the master cam-wheel 71, and the bottle-carrier of the bottle-washing mechanism A, rapidly rotated, this operation also automatically opening the inlet 6 for the inflow of the washing fluid. The several valve-bars 47 and valves 38 being open, the bottles are thoroughly scoured internally by the shot thrown back and forth between the bottles and the shot-boxes by gravity and centrifugal action. At the same time, through the pins 133 on the master cam and the trip 132, the drier-actuating pawl 125 is actuated to effect the intermittent rotation of the drier, and thus drain the previously washed bottles. After the washing operation has been continued for some time, the cam 75 on the slowly turning master cam-wheel 71 operates upon the lever 78 to shift the valve-bar actuating cam 59 from inoperative to operative position. Thereupon said cam 59 operates to close the valves 47 during something more than the lower half revolution of the bottle-carrier, whereby, during the upper half revolution, the shot in the bottles is gradually discharged into the shot-boxes; the shot being prevented by the closed valve-bars 47 from returning into the bottles during the lower half of the revolution of the carrier. In this way the bottles are freed from shot during the final portion of the washing operation, and such shot is collected and confined in the shot-boxes.

In case, in the loading of the machine, one or more bottles or rows of bottles should be lacking, thus leaving the corresponding holder or row of holders 36 empty, the valve 38, automatically closing against the valve-seat 37 by reason of the outward movement of the holder under spring 39 prevents escape and loss of the shot from the shot-boxes. During the washing operation the bottles are also externally cleansed in a thorough manner by being revolved on their own individual axes against the stationary brushes 73 and 74. By the time the bottles have thus been thoroughly washed internally and externally, the cam 158 releases the fast drive, whereupon the slow drive through the clutches 147 and 148 becomes effective, and the cam-projection 84 on the master cam-wheel 71, through the lever 85 and gears 87 and 88, shifts the switches 82 to a position opening the cam-track 81. Under the reduced speed, the discharge of the cleaned bottles to the drier thus begins; the latter being simultaneously emptied of the previous lot of cleaned bottles of their delivery onto the discharge conveyer passing therethrough. Shortly after the delivery of the cleaned bottles to the drier begins, the cam 70 of the master cam-wheel 71 depresses the cam-projection 68 into operative relation to the arm 66 on the pivot-shafts of the tilting saddles 63; so that, as the soiled bottles begin to enter the carrier of the washing machine from the feeding-in conveyer by the engagement of the trip-arm 104 with the rollers of the successive holder-supporting bars, said saddles are tilted to throw the bottles received thereby up between and into alinement with the inner and outer rows of holders, the outer holders passing back into the main track and engaging the butts of the bottles as the latter are thus positioned. In this manner the delivery of a charge of cleaned bottles to the drier and the reloading of the rotary carrier of the washing machine with a fresh charge of soiled bottles are effected simultaneously; the drier being emptied and prepared for a fresh load of washed bottles during the washing movement of the washing mechanism.

From the time that the washer is filled and throughout the washing operation and subsequent emptying and refilling and up to the beginning of the next washing operation, the master cam makes one complete revolution. The master cam rotates at its relatively high speed during the washing operation, which continues from the disengagement of the cam 159 with the roller 157 to the engagement of the cam 158 with the roller 156, the latter causing a change to slow speed. During the slow speed of the washer wherein delivery and refilling takes place, the washer makes one revolution and the master cam travels at its relatively slow speed, which is approximately the speed of the minute hand of a watch, except that its movement is continuous. The extent of travel of the master cam at slow speed or during unloading and refilling is from the point of engagement of the cam 158 with the roller 156 to the point of engagement of the cam 159 with the roller 157. It will thus be seen that the extent of movement of the master cam during unloading and refilling is so slight that the cams 70 and 84 are of sufficient extent to be operative during the entire single revolution of the bottle-carrier which takes place during the unloading and refilling.

The apparatus thus combines economy of space and large capacity with economy of time in the performance of the several operations required. The apparatus is automatic throughout; the individual parts or elements of each mechanism not only coöperating in properly timed relation with each other, but the several mechanisms of the organized machine also coöperating in properly timed relation to perform their several operations upon the bottles.

It will be evident to those skilled in the art that the apparatus as shown and described might be very considerably varied and modified in respect to details without departing from the spirit of the invention or sacrificing any of the advantages thereof, and hence it will be understood that the present illustration is, in respect to details, illustrative only of one practical form in which the principle of the invention may be embodied.

We claim:

1. In an organized machine for washing soiled bottles, the combination with a rotary bottle-washing mechanism, of bottle-introducing and discharging mechanisms in coöperative relation thereto, means for driving said bottle-washing mechanism at a relatively high speed during the washing operation, and means for driving said bottle-washing mechanism at a reduced speed during the loading and unloading operations, substantially as described.

2. In an organized machine for washing soiled bottles, the combination with a rotary bottle-washing mechanism, of bottle-introducing and discharging mechanisms in coöperative relation thereto, means for driving said bottle-washing mechanism at a relatively high speed during the washing operation, means for driving said bottle-washing mechanism at a low speed during the loading and unloading operations, and means for automatically shifting said high and low speed driving means concurrently with the commencement and termination of the washing operation, substantially as described.

3. In an organized machine for washing and draining soiled bottles, the combination with a bottle-washing mechanism, of a feeding-in conveyer for the soiled bottles, a draining mechanism, means for introducing the soiled bottles from said conveyer to said bottle-washing mechanism during the movement of the latter, means for discharging the washed bottles from said washing mechanism to said draining mechanism during the movement of said washing mechanism, and a discharge conveyer adapted to carry off the drained bottles from said draining mechanism, substantially as described.

4. In an organized machine for washing and draining soiled bottles, the combination with a rotary bottle-washing mechanism, and means for imparting a continuous turning movement thereto, of a rotary draining mechanism adapted to receive the washed bottles from the periphery of said washing mechanism, means for driving said washing mechanism at a relatively high speed during the washing operation, means for automatically slowing down the speed during the delivery of the cleaned bottles to the draining mechanism, and means for imparting an intermittent rotary movement to the draining mechanism from the continuous rotary movement of the washing mechanism, substantially as described.

5. In an organized machine for washing soiled bottles, the combination with a rotary carrier having rows of radially-arranged inner and outer bottle-holders, the latter of which are movable radially to clamp and release the bottles, and bars carrying said outer bottle-holders, of fixed circular guide-tracks engaging the ends of said bars, cam-tracks communicating at both ends with said circular guide-tracks, respectively, a feeding-in conveyer for the soiled bottles, and switches for diverting said bars into said cam-tracks whereby to retract said outer bottle-holders preliminary to the introduction of soiled bottles from said conveyer during the loading of the bottle-carrier, substantially as described.

6. In an organized machine for washing soiled bottles, the combination with a rotary carrier having rows of radially-arranged inner and outer bottle-holders, the latter of which are movable radially to clamp and release the bottles, and bars carrying said outer bottle-holders, of fixed circular guide-tracks engaging the ends of said bars, cam-tracks communicating at both ends with said circular guide-tracks, respectively, a feeding-in conveyer for the soiled bottles, switches for diverting said bars into said cam-tracks whereby to retract said outer bottle-holders preliminary to the introduction of soiled bottles from said conveyer during the loading of the bottle-carrier, and means for automatically actuating said switches to connect said cam-tracks with said circular tracks at the inception of the unloading and reloading movement of said rotary carrier, substantially as described.

7. In an organized machine for washing and draining soiled bottles, the combination with a rotary washing mechanism, of a feeding-in conveyer adapted to deliver soiled bottles thereto, a rotary draining mechanism adapted to receive the cleaned bottles from said washing mechanism, driving connections between said washing and draining mechanisms, a master cam-wheel concentric with the axis of said rotary washing mechanism, means for driving said washing mechanism and said master cam-wheel at a relatively high speed during the washing operation and at a low speed during the bottle-receiving and delivering operations, and speed-shifting means actuated by said master cam-wheel at the inception and termination of the washing operation, substantially as described.

8. In an organized machine for washing and draining soiled bottles, the combination with a rotary washing mechanism having bottle-holders movable to engage and release the bottles, of a feeding-in conveyer adapted to deliver soiled bottles thereto, a rotary draining mechanism adapted to receive the cleaned bottles from said washing mechanism, driving connections between said washing and draining mechanisms, a master cam-wheel concentric with the axis of said rotary washing mechanism, means for driving said washing mechanism and said master cam-wheel at a relatively high speed during the washing operation and at a low speed during the bottle-receiving and delivering operations, means actuated by said master cam-wheel to retract said movable bottle-holders for the release of the cleaned bottles at the end of the washing operation, and speed-shifting means actuated by said master cam-wheel at the inception and termination of the washing operation, substantially as described.

9. In an organized machine for washing soiled bottles, the combination with a washing mechanism including a rotary bottle-carrier having radially-arranged groups of inner and outer bottle-holders, of a feeding-in conveyer adapted to deliver soiled bottles at the periphery of said bottle-carrier, pivoted saddles carried by said bottle-carrier adapted to receive the soiled bottles from said conveyer, and automatic means for tilting said saddles so as to place the bottles in position to be engaged by said holders, substantially as described.

10. In an organized machine for washing soiled bottles, the combination with a washing mechanism including a rotary bottle-carrier having radially-arranged groups of inner and outer bottle-holders, the latter whereof are movable to engage and release the bottles, of a feeding-in conveyer adapted to deliver soiled bottles at the periphery of said bottle-carrier, pivoted saddles carried by said bottle-carrier adapted to receive the soiled bottles from said conveyer, a master cam-wheel mounted concentric with the axis of said bottle-carrier, means for rotating said master cam-wheel, means actuated by said master cam-wheel for tilting said saddles whereby to place the bottles in position to be engaged by said holders, and means actuated by said master cam-wheel to retract said movable bottle-holders for the release of the cleaned bottles at the end of the washing operation, substantially as described.

11. In an organized machine for washing and draining bottles, the combination with a washing mechanism having a rotary bottle-carrier provided with holders adapted to support the bottles in radially-arranged rows, of a draining mechanism located alongside of and axially parallel with said washing mechanism, said draining mechanism comprising essentially a stationary inner drum constituting a support for the open ends of the bottles and a series of radially-grouped rows of pockets rotatable around said drum, a guide between said washing and draining mechanisms adapted to transfer the cleaned bottles from the former to the latter, an endless discharge conveyer extending through said drum longitudinally thereof, means for imparting a slow continuous rotation to said bottle-carrier during the discharge of the cleaned bottles therefrom, means for imparting from said bottle-carrier to the pockets of said draining mechanism an intermittent rotary movement around said drum whereby to bring successive rows of pockets into bottle-receiving position relative to said bottle-carrier, and means for imparting from said bottle-carrier to said discharge conveyer a traveling movement whereby to carry off from said draining mechanism successive rows of cleaned and drained bottles, substantially as described.

THOMAS D. KYLE.
EDWARD H. WAUGH.

Witnesses:
SAMUEL N. POND,
FREDERICK C. GOODWIN.